United States Patent Office 3,009,093
Patented Nov. 14, 1961

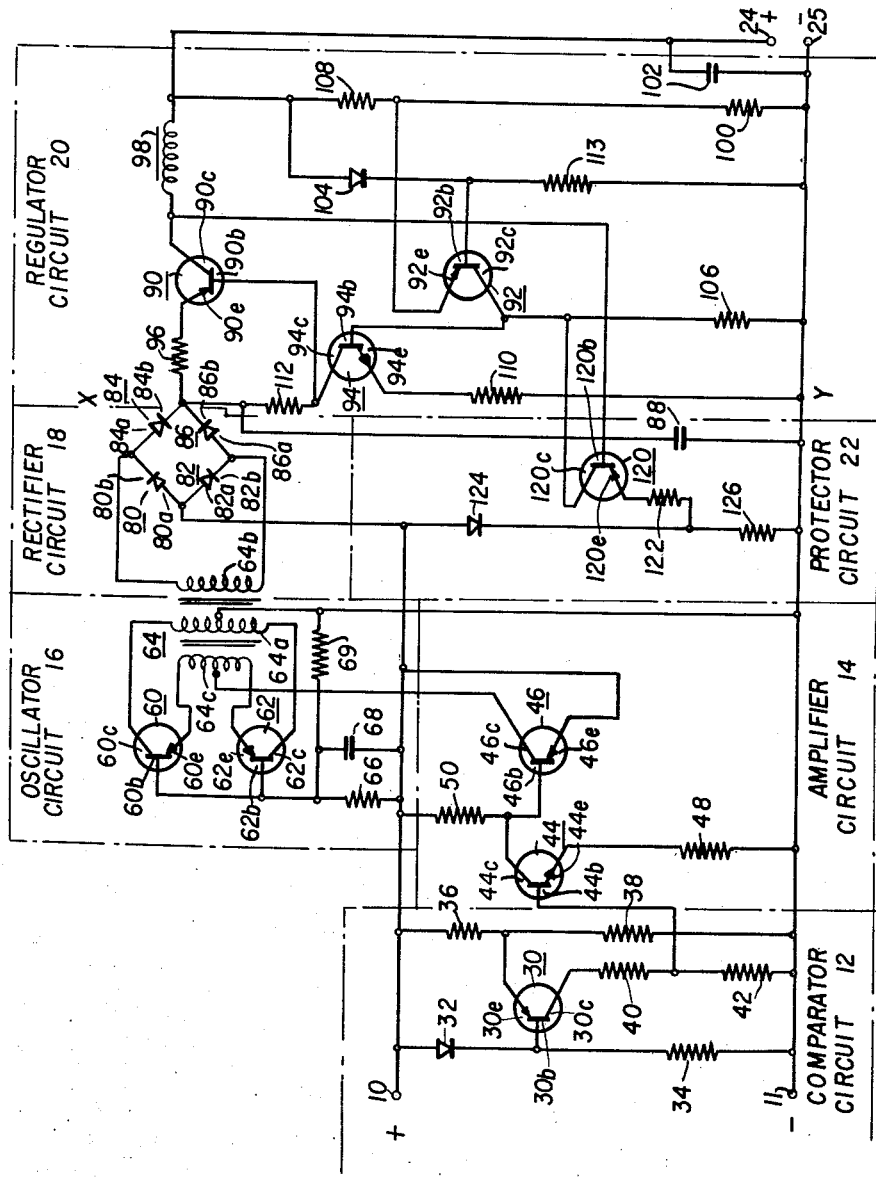

3,009,093
STATIC CONSTANT VOLTAGE D. C. TO
D. C. CONVERTER
Helmut K. Seike, Toledo, Ohio, assignor to Kaiser Industries Corporation, Toledo, Ohio, a corporation of Nevada
Filed Apr. 6, 1959, Ser. No. 804,463
7 Claims. (Cl. 323—22)

The present invention relates to static means for converting a fluctuating voltage D.C. power to a constant voltage D.C. power.

There are many direct circuit electrical devices in military and commercial applications which provide improved performance when energized by a constant value D.C., and in many instances accurate and reliable results are obtained only with the provision of such form of energization. However, in many applications, the environment is such that the provision of a source of such characteristics has been heretofore impractical. That is, in many installations the voltage output of the D.C. power source varies with the applied load, the value decreasing from a high no-load value as a greater load is applied to the power source and increasing as the load is removed. Such variation in voltage supply will, of course, provide improper operation of certain types of units as connected thereto, and there is a definite need in the art for conversion means which are operable to provide a constant output voltage from a fluctuating voltage source.

The recent development and use of transistor devices in electronic control circuits has resulted in the provision of electronic equipment having new and improved operating characteristics, and particularly, in electronic circuits of greater operating stability, higher efficiency of operation, and increased longevity. A particular advantage incident to the use of the transistor device in such type circuits is the resultant minimization of the number and expense of the component parts of the power supply for the circuits, it being not uncommon to utilize an energizing potential of six to thirty volts for the transistor devices as compared with the three or four hundred volt potentials which are normally required for hot cathode type tubes as used in a similar application. Ostensibly, the low operating potentials of transistor devices, in addition to reducing the complexity and size of the power supply, inherently result in the elimination of the shock hazards common to vacuum tube circuits, and substantially improve the operating stability and longevity of the transistorized apparatus. Other additional advantages include reduced operating temperatures which result by reason of the low power consumption of the transistor units, and reduced malfunctioning of the apparatus due to vibration, shock and acceleration forces by reason of the structural nature of the transistor device. Also, transistorized equipment is especially adaptable for use in apparatus which is concerned with problems of weight, size and severe operating forces.

In one type of converter for converting a fluctuating voltage D.C. power to constant voltage D.C. power, an oscillator circuit switches a D.C. input voltage to an A.C. voltage, a transformer steps up the A.C. voltage, and a rectifier converts the A.C. voltage back to a D.C. output voltage. Such a system can maintain the D.C. output voltage at its desired constant level during fluctuations of the D.C. input voltage below its no-load or desired value. Also, due to the high efficiency of the transistor device, transistorized conversion means have a relatively high efficiency of power conversion, usually in the neighborhood of 80 percent.

However, since the oscillator circuit provides the total output power of such a converter, 20 percent of the total output power of this type of converter is dissipated into an unusable form—primarily heat. For example, if a total output power of 260 watts is desired, a total input of 325 watts is required and 65 watts of power is lost or dissipated as heat. Such loss of power in addition to being uneconomical, results in the production of a heat factor which may be injurious to the transistors as well as causing variations in the operating characteristics thereof.

It is therefore a general object of the present invention to provide an improved converter means for converting a fluctuating voltage D.C. power to a constant voltage D.C. power, and particularly to a converter of such type which has a higher efficiency of conversion, and which requires a smaller heat dissipation for a given load than was heretofore known.

It is a further object of the present invention to provide improved means for converting a low voltage D.C. power to a high voltage D.C. power.

It is a further object of the present invention to provide improved means transistor elements for converting a fluctuating voltage D.C. power to a constant voltage D.C. power which includes further means for automatically protecting the transistors from overheating.

A novel feature of the present invention is the manner in which the fluctuating D.C. input voltage of an electronic power converter is used as a part of the D.C. output voltage, an electronic oscillator being energized whenever the value of the input or output voltage drops below a given value to provide an output voltage which is related to the drop in value, and associated mixer means being connected to combine the added output serially to the fluctuating input voltage to provide a combined signal which is constant D.C. output voltage of a predetermined desired value. Such arrangement is of particular advantage in that only a small fraction of the total output power is produced by the electronic oscillator; and therefore only a small fraction of output power is subject to the twenty percent power loss of conversion.

The improved static converter of the present invention thus provides a constant D.C. voltage power output with a reduced power loss which results in a substantial reduction in heating through power consumption to thereby provide improved stability of operation of its electronic devices and minimization of the possibility of damage to the electronic devices through overheating.

Briefly, the improved converter of the present invention comprises a comparator means for comparing the voltage level of the fluctuating D.C. voltage input signal with a fixed reference level to supply a control signal in response to the detection of a difference between the two levels, an oscillator which is operative in response to the control signal of the comparator means to produce an A.C. power output signal whose amplitude is dependent upon the value of the control signal, and a rectifier means to rectify the A.C. output of the oscillator to a D.C. signal and to combine the rectified D.C. signal with the input D.C. signal. Since the amplitude of the rectified D.C. signal is dependent upon the difference of the input D.C. signal from the reference level the circuit parameters may be so designed to permit the rectified D.C. signal to provide an equal and opposite voltage for correction of any such difference, thereby maintaining a constant voltage D.C. output signal from the rectifier circuit. In the disclosed embodiment a correction voltage is provided for variation of the voltage below a given level, and the manner of providing a correction signal for variation in both directions from such level will be apparent therefrom.

A regulator circuit may be added to regulate the output voltage to a more constant voltage level under varying load conditions. This regulator circuit may include transistor devices, which are subject to damage by the passage of overload currents. Therefore, one embodiment of the improved converter also includes a new and novel automatic current overload protection means which is operative to protect the transistor devices by biasing them to increase their apparent resistance in response to detection of an overload current. This increase in apparent resistance causes a decrease in the output current, reducing it to an allowable level.

These and other features of the present invention will become apparent with reference to the following specification, claims and drawing which sets forth a schematic diagram of a transistorized circuit of a preferred embodiment of the invention.

*General circuit description*

Referring to the drawing, the basic circuit of the present invention comprises a pair of input terminals 10, 11 for connecting the fluctuating D.C. voltage of a supply source thereto, a comparator circuit 12 for comparing the voltage level of the fluctuating voltage D.C. signal to a fixed voltage reference level and for providing a control signal of a value which is related to the difference between the voltage levels; an amplifying circuit 14 for amplifying the control signal, a voltage booster circuit comprising an oscillator circuit 16 coupled to the amplifier 14 and operative in response to the application of the amplified control signal to produce an A.C. correction signal, a rectifier circuit 18 operative to convert the A.C. correction signal to a D.C. correction signal and to add this correction signal to the fluctuating D.C. input signal to provide an output power signal across a pair of output terminals 24, 25.

The fixed voltage reference level of the comparator circuit 12 may be self-contained therein and provided by electronic fixed potential means, such as a Zener diode. Other known methods and apparatus may also be utilized for such purpose. The voltage amplitude of the output alternating current signal of the oscillator 16 is dependent upon the level of the amplified control signal coupled thereto by the amplifier 14, and is designed to produce a D.C. correction signal at rectifier 18 which is of equal amplitude and of a polarity to supply the difference in potential between the input and the desired voltage levels. Thus, when the D.C. correction signal voltage is serially added to the D.C. input signal voltage, the resultant sum is the desired output power signal of the improved D.C. to D.C. power converter.

The regulation of the voltage level of the output power signal may be further improved by including a regulation means in the circuit of the improved converter, the output power signal of the rectifier 18 in such arrangement being coupled through a regulator circuit 20 to the output terminals 24, 25. The output of the regulator circuit 20 is also coupled to a novel overload protector circuit 22 which produces an output signal to control the apparent resistance of the electronic devices of the regulator 20 in response to the detection of an overload current condition in those electronic devices. Thus, the detection of overload current by the protector circuit 22 automatically produces a decrease in the output current by raising the apparent resistance of the regulator circuit 20.

With reference to the drawing, the circuit of a transistorized design of the preferred embodiment is now described in detail. As noted heretofore, the novel static inverter basically comprises a comparator circuit 12, an amplifier circuit 14, an oscillator circuit 16, a rectifier circuit 18, a regulator circuit 20, and an overload protector circuit 22.

Comparator circuit 12 is connected between input terminals 10, 11 and the amplifier circuit 14 for the purpose of comparing the voltage level of the input D.C. signal across input terminals 10, 11 with a fixed, self-contained reference voltage level to provide an output signal which is dependent upon the potential difference between the two voltage levels.

The comparator circuit 12 comprises Zener diode 32 which is coupled across input terminals 10, 11 and a PNP transistor 30, having a base electrode 30$b$, a collector electrode 30$c$, and an emitter electrode 30$e$ connected to provide an output signal to the amplifier circuit 14 in response to a reduction in the signal across the resistors 36—38.

More specifically, the base 30$b$ is connected to a voltage divider comprising a resistor 34 and the Zener diode 32, resistor 34 being connected between the base 30$b$ and the negative input terminal 11, and the Zener diode 32 being connected between the base 30$b$ and the positive input terminal 10. The emitter 30$e$ is connected to a voltage divider comprising a pair of resistors 36, 38 which are connected between the positive input terminal 10 and the negative terminal 11. The collector 30$c$ is coupled over a pair of load resistors 40, 42 to the negative terminal 11, the common connection between the two load resistors 40, 42 being coupled to the input circuit for the amplifier circuit 14.

The Zener diode 32 is back-biassed by the fluctuating input voltage applied to the input terminals 10, 11. When this fluctuating voltage is at its desired level, e.g., 26 volts in the illustrated arrangement, the Zener diode 32 is back-biassed to its Zener voltage and the base 30$b$ is biassed beyond its cut-off point, so that no signal is produced at the collector 30$c$. When the fluctuating voltage rises above its desired value, e.g., above 26 volts, the voltage at the emitter 30$e$ increases due to the increased current flow through resistors 36, 38, and transistor 30 is more strongly cut off (due to back bias) still producing no signal at the collector 30$c$. However, when the fluctuating voltage falls below its desired level of 26 volts in the illustrated arrangement, the back-bias voltage which is coupled to the emitter 30$e$ decreases, and transistor 30 conducts to provide a positive signal at the collector 30$c$, the value of the signal being related to the value of the bias signal coupled thereto and thereby the value of the fluctuating input voltage. Thus the comparator circuit 12 produces a positive (or error) signal output to be coupled to the amplifier circuit 14 only in response to a decrease in the input voltage below its desired level. In response to an input voltage of desired level, or greater than desired level, no signal output is produced.

The amplifier circuit 14 is connected between the comparator circuit 12 and the oscillator circuit 16 for the purpose of amplifying the output signal of the comparator circuit 12 prior to coupling thereof to the oscillator circuit 16 to control its operation.

Amplifier circuit 14 comprises a first and a second transistor 44, 46, each having a base electrode 44$b$, 46$b$, a collector electrode 44$c$, 46$c$, and an emitter electrode 44$e$, 46$e$, respectively, connected in a first and a second cascaded amplifier circuit to control the operation of the oscillator circuit 16 in response to signals produced by the comparator circuit 12.

The first transistor 44 is of the NPN type, and is connected in a common-emitter amplifier circuit. The base 44$b$ of the first transistor 44 is coupled to the midpoint of voltage divider resistors 40, 42 of the comparator circuit 12; the emitter 44$e$ is coupled over a current feedback resistor 48 to the negative terminal 11; and the collector 44$c$ is coupled over a load resistor 50 to the positive input terminal 10, and is directly connected to the base 46$b$ of the second transistor 46. The second transistor 46 is of the PNP type to thus control the operation thereof with variation of the voltage of the supply source from the desired level, the emitter 46$e$ of the second transistor 46 being connected to positive terminal 10 and the collector 46$c$ being connected to couple the output signal (amplified error signal) of the transistor 46 to the emitter circuits of the transistors 60, 62 of oscillator circuit 16.

Since the first transistor 44 is of the NPN type, it is apparent that positive signals applied to its base 44b from the comparator circuit 12 produce amplified negative signals at its collector 44c which are applied directly to the base 46b of the second transistor 46. The first transistor 44 thus provides voltage amplification of the output signals of the comparator circuit 12, and since the second transistor 46 is of the PNP type, the amplified negative signals applied to the base 46b cause high current to flow through transistor 46 and therefore allow high current to flow over control circuit to oscillator circuit 16.

The oscillator circuit 16 is connected between amplifier circuit 14 and rectifier circuit 18 for the purpose of providing a square wave A.C. signal output to rectifier circuit 18 in response to the receipt of a signal from amplifier circuit 14. A further feature of the oscillator circuit 16 is that the amplitude of the square wave output signal coupled to rectifier circuit 18 is dependent upon the value of the signal coupled thereto by amplifier circuit 14 which is in turn related to the value of the output signal of comparator 12 and the variation of the input voltage from the assigned constant value.

Oscillator circuit 16 comprises a first and a second transistor 60, 62, each having a base electrode 60b, 62b, an emitter electrode 60e, 62e, and a collector electrode 60c, 62c, respectively, connected in a self-oscillation circuit to produce an output signal to the rectifier circuit 18 through a three-winding transformer 64, having a center tapped primary winding 64a, a secondary winding 64b, and a center tapped feedback coil 64c.

The bases 60b, 62b are connected together and the common point is connected over the parallel combination of resistor 66 and a capacitor 68 to the positive input terminal 10, and is also connected through resistor 69 to the negative terminal 11 in order to assure self starting of oscillation when the inverter unit is first turned on and the voltage of the source is such that a control signal is coupled to oscillator 16 by the comparator-amplifier circuit.

The emitters 60e, 62e are coupled to opposite sides of the feedback coil 64c, and over the center tap thereon to the collector of 46, such connection comprising the control circuit over which comparator circuit 12 and amplifier circuit 18 control the operation of oscillator circuit 16. The collectors 60c, 62c are coupled to opposite sides of the primary winding 64a and from its center tap to the negative terminal 11. The primary winding 64a and feedback coil 64c are magnetically coupled to a common flux path in the transformer 64, so that an excitation in one induces an excitation in the other.

The output of the oscillator comprises a square wave signal, the frequency of which is determined by the number of turns in the primary winding 64a, the supply voltage and the saturation flux of the core. The amplitude of the square wave output is determined by the value of the control signal input current and the turns-ratio of the windings of transformer 64. More specifically, assuming initially that the supply voltage at terminals 10, 11 is 26 volts, it is apparent that the comparator circuit 12 and amplifier circuit 14 will provide a zero value signal causing zero current flow over the winding of transformer 64 and preventing oscillation of the circuit.

Assuming now that the input voltage at terminals 10, 11 drops below 26 volts, the comparator circuit 12 and amplifier circuit 14 will permit control current to flow to transistors 60, 62 to initiate conductivity thereby. Transistors 60, 62 operate in an alternate sequence, one transistor being driven to cut-off as the other transistor is biassed to conduct. Assuming for purposes of illustration that transistor 60 is initially conductive, (transistor 62 being therefore in the cut-off state) a current flow is established from terminal 10 over resistor 66, transistor 60, the upper half of transistor primary winding 64a to the negative conductor connected to terminal 11, and the voltage in the windings is at maximum value. Such condition persists until the transformer core begins to saturate and the rate of change of flux decreases to cause the induced voltages in the feedback winding 64c to decrease toward zero. As the voltage coupled to the emitter electrode of transistor 60 decreases, the current flow thereover is progressively decreased and an increasing flux builds up in the opposite direction to induce a voltage of opposite polarity in the windings and to initiate conduction of transistor 62. Transistor 62 operates in a like manner, and in turn effects the operation of transistor 60 and the cut-off of transistor 62. The signal from the amplifier circuit 14 controls the amplitude of the voltage of the output signal from the transistors 60, 62, due to controlled current flowing through the emitter-collector paths of 60 and 62.

Thus, the oscillator circuit 16 produces no output signal as long as the input signal to the converter is of the desired voltage level, or a higher voltage level. When the input voltage decreases below its desired value, the control signal from the amplifier circuit 14 causes the transistors 60, 62 to conduct, and the transistors 60, 62 are then driven alternately to saturation and to cut-off in a push-pull manner, causing oscillator circuit 16 to produce a square wave output signal to be coupled through transformer 64 to the rectifier circuit 18. The amplitude of this square wave signal is directly proportional to the magnitude of the control current from amplifier circuit 14, and therefore is directly proportional to the difference between the voltage level of the input signal across input terminals 10, 11 and the voltage level desired.

An oscillator of the free-running square-wave type is used because a square wave signal produces less ripple signal when rectified. Further, in driving the transistors 60, 62 to saturation and cut-off, a minimum dissipation is produced within the transistors. In the illustrated embodiment, the oscillator operates at approximately two kilocycles, which frequency is of an order to assure economical filtering.

Power transistors are used in this stage, so that no following amplifying stages are necessary, thereby simplifying the circuitry in the improved converter. The frequency of cycling may be determined by the design of the values of the inductance of the transformer 64 in accordance with principles well known to persons skilled in the art.

The rectifier circuit 18 is connected from the input terminals 10, 11 and oscillator circuit 16 to regulator circuit 20 for the purpose of combining the signals coupled thereto from both the input terminals 10, 11 and the oscillator circuit 16 to produce a constant voltage D.C. signal output coupled to the regulator circuit 20.

The rectifier circuit 18 comprises a set of four diodes 80, 82, 84, 86, each having an anode 80a, 82a, 84a, 86a, and a cathode 80b, 82b, 84b, 86b, respectively, connected in a bridge rectifying circuit driven by D.C. signals from input terminals 10, 11 and by the A.C. square wave output signals of the three-winding transformer 64 to provide a D.C. output power signal to the regulator 20.

The anodes 80a, 82a, of the first two diodes 80, 82 are coupled together, and the common point connected to the positive input terminal 10 and cathodes 80b, 82b are each connected to an anode 84a, 86a of one of the second two diodes 84, 86, the common points being connected to opposite ends of the secondary winding 64b to receive the square wave output signals from the oscillator circuit 16. The cathode 84b, 86b of the second two diodes 84, 86 are connected together and the common point coupled to the regulator circuit 20, the common point of the cathodes 84b, 86b being also coupled through a capacitor 88 to the negative terminal 11.

It is apparent that any positive D.C. voltage signal appearing at the positive input terminal 10 is conducted over all the diodes 80, 82, 84, 86 of the rectifier bridge circuit 18 to provide a positive output signal to the regulator circuit 20. Also, one half of each A.C. square wave output signal from the oscillator circuit 16, during which the top end of the secondary winding 64b is positive, is conducted over diode 82 and 84 to provide an additional positive output signal to the regulator 20 which is superimposed upon the positive output signal caused by the input D.C. voltage signal. The second half of the A.C. square wave input signal in which the lower end of the secondary winding is positive is conducted over diode 80 and 86 to provide a signal to the regulator circuit 20 during the second portion of each cycle of the oscillator 16. Therefore, the A.C. square wave input signal to the rectifier circuit 18 from the three winding transformer 182 is rectified to produce a positive D.C. output signal which is superimposed upon the D.C. input signal across the input terminals 10, 11 and which is of a value to provide in combination with the D.C. voltage on conductors 10, 11, a constant D.C. voltage power output signal. Further, only a fraction of the total output power is converted and there is a corresponding reduction in the power lost through heat dissipation.

The diodes 80, 82, 84, 86 of bridge rectifier circuit 18 are of the silicon type to provide thermal stability, and capacitor 88 is connected across the output to filter the A.C. ripple signal from the D.C. output signal of rectifier circuit 18.

It will be apparent to parties skilled in the art that the basic circuit thus described may be utilized in numerous applications to provide a constant D.C. voltage output circuit, is sufficiently well regulated to provide the desired operation of the associated components, and that such arrangement may be connected to provide equal and opposite correction voltages for variation both upward and downward from a desired level. It is further apparent that in many applications the output load conditions may be fairly constant and little variation in demand will occur, so that the unit thus far described provides a satisfactory source. In other applications the equipment may be such that the load demand varies substantially and in such application the novel converting devices include a regulator means for the purpose of maintaining the desired regulation with variable load conditions. A more simple type of regulator circuit 20 is set forth hereat, reference also being made however to an improved form of regulator which is set forth in applicant's copending application entitled "Static Constant Voltage D.C. to D.C. Converter," which was filed January 28, 1960, received Serial No. 5,184, and is assigned to the assignee of the present invention.

As shown in FIGURE 1, regulator circuit 20 is connected between rectifier circuit 18 and output terminals 24, 25, and operates to maintain a constant value D.C. output signal with an increase of voltage at terminals 10, 11 and also to further filter out any A.C. ripple signal in the D.C. output signal of the rectifier circuit 18.

The regulator 20 basically comprises a first transistor 90, having a base electrode 90b, a collector electrode 90c, and an emitter electrode 90e, connected as a series degenerative element to control the output signal to output terminals 24, 25, and a second and third transistor 92, 94, each having a base electrode 92b, 94b, a collector electrode 92c, 94c, and an emitter electrode 92e, 94e, respectively, connected as a biasing arrangement to control the operation of the first transistor 90. The emitter 90e of the first transistor 90 is connected over a resistor 96 and the output terminal X to the rectifier output. The collector 90c is connected to one side of a choke member 98, the other side of which is connected to the positive output terminal 24, over capacitor 102 to negative terminal 25, and over resistors 108 and 100 to the negative terminal 25, the emitter 92e of the second transistor 92 being connected to the junction of resistors 100 and 108. The collector 90c is also connected to the over load protection circuit and over output inductance 98 and Zener diode 104 to the base 92b of the second transistor 92. The collector 92c of the second transistor 92 is coupled to the base 94b of the third transistor 94 and is further coupled over resistor 106 to negative terminal 11. The emitter 94e of the third transistor 94 is coupled over a resistor 110 to the negative terminal 11, and the collector 94c is connected directly to the base 90b of the first transistor 90 and also over resistor 112 and terminal X to the rectifier circuit 18.

The voltage signal output which is coupled to terminals X and Y by the basic converter circuit is further regulated by controlling tthe first transistor 90 to provide a variable voltage drop. Briefly, Zener diode 104 which is connected in the output collector circuit of transistor 90 maintains a fixed voltage difference between the output voltage level at the output terminal 24 and the bias voltage level at the base 92b of the second transistor 92. Any change in the output voltage level produces a change in the value of the signal which is coupled to the base of the second transistor 92, which is amplified and inverted by transistor 92 to provide a drive signal change to the third transistor 94. Third transistor 94 again amplifies and re-inverts the signal change before applying it to the base 90b of the first transistor 90. Thus, an increase in the output voltage level produces a positive signal change at the base 90b, which in turn increases the voltage drop from the emitter 90e to the collector 90c, thereby decreasing the output voltage level to its desired value. Similarly, a decrease in the output voltage level produces a negative signal change at the base 90b, causing a decrease in the voltage drop from the emitter 90e to the collector 90c of the first transistor 90, thereby increasing the output voltage level.

The regulator circuit 20 thus provides very accurate corrections to the voltage level of the D.C. output power signal over a small voltage range, and the circuit is particularly adapted to correct fluctuation in output voltage due to variations in loading conditions.

The choke 98, resistors 108 and 100, and capacitor 102 provide the converter with an inductance input type filter circuit to shunt any A.C. ripple voltage which may be present in the output signal due to the oscillator circuit 16. Such type of filter has good regulation characteristics, and therefore further minimizes output voltage fluctuations with varying load conditions. In the illustrated embodiment, the choke had a D.C. resistance of approximately 0.1 ohm. The maximum power dissipation in the choke is 10 watts and the maximum power dissipation in transistor 90 is 10 watts at full load making a total maximum power dissipation in the series regulator of 20 watts.

It is apparent that the three transistors 90, 92, 94 of the regulator 20 must operate in the regions of their linear characteristic curves, and that the transistors are subject to damage by excessively high voltage signals. Accordingly, a novel overload and short circuit protection circuit 22 is coupled across the regulator circuit 20 to protect the first transistor 90 of the regulator circuit 20 from damage due to currents of greater than its rated value by increasing the apparent resistance of transistor 90 in response to the detection of an overload current condition.

The novel overload protection circuit 22 comprises a PNP transistor 120, having a base electrode 120b, a collector electrode 120c, and an emitter electrode 120e, connected to provide an output signal to the regulator circuit 20 in response to the detection of an overload current through transistor 90 of regulator circuit 20. Base 120b is connected to the collector 90c of the first transistor 90 of the regulator 20; emitter 120e is coupled through a resistor 122 to a voltage divider comprising a Zener diode 124 and a resistor 126 connected from the positive input terminal 10 to the negative terminal 11; and collector 120c is connected over resistor 106 to the negative terminal 11.

Transistor 120 is normally biased to cut-off by the voltage signal applied to emitter 120e by the voltage divider comprising Zener diode 124 and resistor 126. It remains in this state during any normal loading of the regulator transistor 90. However, an overloading or short circuit condition causes an increase in the current output of the regulator transistor 90 above its rated value, causing the voltage drop across the regulator transistor 90 to increase, and thereby decreases the bias voltage on the base 120b of the protector transistor 120. Since the protector transistor 120 is of the PNP type, an increase in the voltage signal to its base 120b makes it more conductive. As transistor 120 becomes more conductive, it draws a collector current through resistor 106, which is also coupled to the collector 92c of the second transistor 92 of the regulator 20, and the additional current through resistor 106 tends to bias the third transistor 94 to cut-off, causing its collector 94c to couple a positive signal to the base 90b to effect less drive of the regulator transistor 90, causing an increase in its apparent resistance, and therefore decreasing the current from an overload condition to its rated value

*Conclusion*

Thus the improved static converter of the present invention provides a constant voltage D.C. output power signal the voltage of which remains constant over a large range of input signal voltage fluctuations and output loading conditions, and which has no superimposed A.C. ripple voltage. Since transistors are utilized in the illustrated preferred embodiment, the converter is easily portable and capable of dependable operation under severe operating forces such as shock, vibration, and extreme temperature conditions.

Further, since under normal conditions, the input voltage has a magnitude sufficient in itself to provide the desired output level, the booster portion of the inverter is then not operative so that little power dissipation is experienced in such portion of the inverter circuit. Further since only a part of the total output power signal is provided by the booster circuit when a variation from the desired level occurs, only a small part of the power output is subject to power dissipation in the signal transformation, and as a result, the efficiency of conversion of the total output power of the converter is higher than the 80 percent efficiency of conversion generally experienced heretofore with known circuit designs. Manifestly by deriving a portion of the total output power directly from tthe source connected to terminals 10, 11 the inverter can be made much smaller in size and consists of lower power components of a reduced size, and lifetime expectancy is substantially increased.

It is apparent that this same principle of using the input signal directly as part of the output D.C. voltage signal may be used in a low voltage D.C. to high voltage D.C. conversion. Thus the illustrated embodiment may be transformed into such a low to high voltage D.C. converter by using a stepup transformer in lieu of the three winding transformer. In this embodiment also, only a part of the total output signal power is subject to the D.C. to A.C. square wave to D.C. signal transformation, and the efficiency of this type of converter is thereby increased. Further, such principle may be used in an arrangement in which the comparator means examine the output load for variation in value, as well as in arrangements in which the comparator means examine the value of the input signals.

Overheating and change of the transistor by the occurrence of too great a load at output terminals 24, 25, or by the occurrence of a short circuit across the terminals 24, 25 are prevented by the action of the overload protection circuit 22 in a new and novel manner, whereby increased application of the converter device is afforded.

While a particular embodiment of the invention has been shown and described, it is apparent that modifications and alterations may be made, and it is intended in the appended claims to cover all such modifications and alterations as may fall within the true spirit and scope of the invention.

What is claimed is:

1. A static inverter device for providing a constant voltage output from a variable direct current voltage source comprising: an input circuit for coupling the inverter device to said source; comparator circuit means coupled to said input circuit including means for deriving an error signal indicative of the variation of the voltage signal of said source from a predetermined value, the value of the error signal being related to the value of the variation of the source voltage from said predetermined value; a voltage booster circuit; means for coupling the error signal to said voltage booster circuit to effect the operation thereof in the provision of an output signal which is of a value when combined with said source voltage signal to provide a combined voltage signal of said predetermined value; signal combining means; means for coupling said variable source voltage signal and the output signal of said voltage booster circuit to said signal combining means, whereby the value of the output of said signal combining means is constant at said predetermined value independent of variations of the source voltage signal, and only a portion of the total output power is varied by the inverter device to provide a constant value output; and means for extending the constant voltage signal output of said signal combining means to associated equipment.

2. A static inverter device for providing a constant voltage output from a variable direct current voltage source comprising: an input circuit for coupling the inverter device to said source; comparator circuit means coupled to said input circuit including means for deriving an error signal indicative of the variation of the voltage signal of said source from a predetermined value, the value of the error signal being related to the value of the variation of the source voltage signal from said predetermined value; a square wave oscillator circuit including means for normally biassing said oscillator circuit to cutoff; means for applying the error signal to said oscillator circuit to effect the operation thereof whenever the source voltage signal varies below said predetermined value, the amplitude of the oscillator square wave signals being of a value in combination with said source voltage signal to provide a voltage signal of said predetermined value; signal rectifying means; means for coupling the signal outputs of said variable source and said oscillator circuit to said signal rectifying means, whereby the output voltage of said signal rectifying means is consistently of said predetermined value independent of variations of the source voltage signal and only a fraction of the output power is varied by the inverter to accomplish the constant voltage output; and means for extending the constant voltage output of said signal rectifying means to associated equipment.

3. An inverter device as set forth in claim 2 in which each of said comparator circuit means, oscillator circuit, and signal rectifying means is comprised of solid state components and in which said comparator circuit means includes a Zener diode and a resistance member connected across said input circuit, and a semiconductor device having an element coupled to a reference point between said diode and said resistance member to generate said error signal output responsive to variation of the voltage signal of the source below said predetermined value and the corresponding change in the value of voltage at said reference point.

4. A static inverter device for providing a constant voltage output from a variable direct current voltage source comprising: an input circuit for coupling the inverter device to said source; comparator circuit means coupled to said input circuit operative to provide an error signal which is continually indicative of the amount of variation of the voltage signal of said source below a predetermined value; a voltage booster circuit; means coupled to said comparator circuit for applying the error signal to said voltage booster circuit to effect the operation thereof, the amplitude of the voltage booster output signals being of a value in combination with said source voltage signal to provide a voltage signal of said predetermined value; signal combining means coupled to said input circuit and to said voltage booster circuit for adding the outputs of said variable source and of said voltage booster circuit; output means for extending the constant voltage output of said signal combining means to associated load equipment; and a regulator stage coupled to said output means operative to adjust the output voltage of said signal combining means to a constant value independent of variable conditions in said load equipment.

5. An inverter device as set forth in claim 4 in which said regulator circuit includes a regulator semiconductor device coupled in series with said output means to control the value of current flow thereover, reference means coupled to said output means for providing a correction signal related to the value of variation of the load voltage from a given norm, and bias amplifier means coupled to said reference means including a first and second semiconductor device connected to amplify said correction signal and to apply the amplified correction signal to said regulator semiconductor device to control same in the maintenance of the desired output voltage.

6. A static inverter device for providing a constant voltage output from a variable direct current voltage source comprising: an input circuit for coupling the inverter device to said source; comparator circuit means connected to said input circuit operative to provide an error signal which is continually indicative of the amount of variation of the voltage signal of said source from a predetermined value; a voltage booster circuit; means for coupling the error signal to said voltage booster circuit to effect the operation thereof, the amplitude of the voltage booster output signal being of a value in combination with said source voltage signal to provide a signal of said predetermined value; signal combining means coupled to said input circuit and to said voltage booster circuit for adding the outputs of said variable source and said voltage booster circuit; and overload protection means coupled to the output circuit of said signal combining means operative to provide a control signal for limiting the load current to a given safe predetermined value.

7. A static inverter device for providing a constant voltage output from a variable direct current voltage source comprising: an input circuit for coupling the inverter device to said source; a comparator circuit connected to said input circuit operative to provide an error signal which is continually indicative of the amount of variation of the voltage signal of said source from a predetermined value; an oscillator circuit; means for coupling the error signal to said oscillator circuit to effect the operation thereof, the amplitude of the oscillator output signal being thereby of a value in combination with the D.C. source signal to provide a voltage signal of said predetermined value; signal combining means having a first set of input terminals coupled to said input circuit and a second set of input terminals coupled to said oscillator circuit for rectifying the varying output of said oscillator circuit and adding the rectified output to the D.C. output of said variable source; output circuit means coupled to said signal combining means for extending the constant voltage output of said signal combining means to associated equipment; a regulator stage connected to said output circuit including a regulator device connected in series with the output circuit to control the value of current flow thereover; reference means connected to said output means for deriving a correction signal indicative of variations in the output voltage due to load variations; coupling means for coupling said correction signal to said regulator device; and overload and short circuit means coupled to said output circuit for preventing the occurrence of overload and short circuit conditions including means for deriving a regulating signal responsive to the occurrence of an overload current, and means for coupling said regulating signal to said coupling means to effect operation of said regulator means in the limiting of the load current to a safe value.

No references cited.